US012567637B2

(12) United States Patent
Yang et al.

(10) Patent No.: US 12,567,637 B2
(45) Date of Patent: *Mar. 3, 2026

(54) BATTERY PACK AND ELECTRICAL CONSUMER

(71) Applicant: Hithium Tech HK Limited, Kowloon (HK)

(72) Inventors: Qiang Yang, Xiamen (CN); Weidong Xu, Xiamen (CN); Nan Zhang, Xiamen (CN)

(73) Assignee: HITHIUM TECH HK LIMITED, Kowloon (HK)

( * ) Notice: Subject to any disclaimer, the term of this patent is extended or adjusted under 35 U.S.C. 154(b) by 787 days.

This patent is subject to a terminal disclaimer.

(21) Appl. No.: 17/898,845

(22) Filed: Aug. 30, 2022

(65) Prior Publication Data

US 2023/0060237 A1 Mar. 2, 2023

(30) Foreign Application Priority Data

Aug. 31, 2021 (CN) .......................... 202122087599.5

(51) Int. Cl.
*H01M 50/256* (2021.01)
*H01M 50/213* (2021.01)
(Continued)

(52) U.S. Cl.
CPC ....... *H01M 50/256* (2021.01); *H01M 50/213* (2021.01); *H01M 50/242* (2021.01); *H01M 50/262* (2021.01)

(58) Field of Classification Search
CPC ............. H01M 50/256; H01M 50/213; H01M 50/242; H01M 50/262; H01M 50/247; H01M 50/204; Y02E 60/10
See application file for complete search history.

(56) References Cited

U.S. PATENT DOCUMENTS 4,632,888 A * 12/1986 Kump ................. H01M 50/256
16/DIG. 15
6,022,638 A * 2/2000 Horton ................ H01M 50/256
16/DIG. 15
(Continued)

FOREIGN PATENT DOCUMENTS

CN 2763204 Y 3/2006
CN 101784172 A 7/2010
(Continued)

OTHER PUBLICATIONS

JP 2009-277504 machine English translation (Year: 2009).*
CNIPA, First Office Action for corresponding Chinese Patent Application No. 202111015507.0, Nov. 10, 2022, 15 pages.

*Primary Examiner* — Michael L Dignan
(74) *Attorney, Agent, or Firm* — Hodgson Russ LLP

(57) ABSTRACT

A battery pack and an electrical consumer are provided. The battery pack includes multiple battery cells, a box, and a handle. The box defines a first accommodation cavity and a second accommodation cavity, the second accommodation cavity is defined at a side of the first accommodation cavity, the multiple battery cells are accommodated in the first accommodation cavity, at least one reinforcing portion is disposed in the second accommodation cavity, and the at least one reinforcing portion protrudes from a top of the second accommodation cavity towards a bottom of the second accommodation cavity. The handle includes a handle body and a connecting portion. The connecting portion is connected with the handle body, the connecting portion defines at least one top-open groove at a top of the connecting portion, and the connecting portion is disposed in the second accommodation cavity.

20 Claims, 5 Drawing Sheets

100

(51) Int. Cl.
    *H01M 50/242*      (2021.01)
    *H01M 50/262*      (2021.01)

(56)           References Cited

U.S. PATENT DOCUMENTS

| | | | | |
|---|---|---|---|---|
| 6,117,588 A | * | 9/2000 | Campbell | ........... H01M 50/256 |
| | | | | 16/DIG. 15 |
| 2018/0102517 A1 | * | 4/2018 | Tononishi | ........... H01M 50/256 |
| 2022/0336907 A1 | * | 10/2022 | An | ...................... H01M 50/204 |

FOREIGN PATENT DOCUMENTS

| | | | | |
|---|---|---|---|---|
| CN | 210349943 U | 4/2020 | | |
| CN | 210723183 U | 6/2020 | | |
| EP | 2280436 A2 | 2/2011 | | |
| JP | 2009-277504 | * 11/2009 | ............. H01M 2/10 | |
| JP | 2009277504 A | 11/2009 | | |

* cited by examiner

100

40

27

10

26

20

40

41(47)

43

3a

42

25

BATTERY PACK AND ELECTRICAL CONSUMER

CROSS-REFERENCE TO RELATED APPLICATIONS

This application claims priority under 35 U.S.C. § 119(a) to Chinese Patent Application No. 202111015507.0, filed Aug. 31, 2021, and Chinese Patent Application No. 202122087599.5, filed Aug. 31, 2021, the entire disclosure of which are incorporated herein by reference.

TECHNICAL FIELD

This disclosure relates to the field of household batteries, and in particular to a battery pack and an electrical consumer.

BACKGROUND

Under pressures of energy crisis and environmental pollution, safety, environmental protection, and energy conservation are becoming more and more important in today's social development. Therefore, an energy storage device is more and more widely used due to the energy storage's characteristics of energy-saving, environmental protection, and pollution-free. For example, the energy storage device can be used in an electric vehicle, an electronic device, and other application fields. A battery pack, as a key component of a household battery device, plays a role in helping a battery to ventilate and dissipate heat, insulating and waterproofing the battery, and protecting the battery from collision.

In the related art, the battery pack is maintained and replaced at a relatively high frequency. One of main reasons is that a handle of the battery pack is generally integrated with a box, which is conducive to processing, molding, and mounting to a certain extent, but will lead to stress concentration and a low structural strength in a connection part between the handle and the box, resulting in fracture of the connection part between the handle and the box, thereby affecting normal use of the whole battery pack.

SUMMARY

According to implementations of a first aspect of the present disclosure, a battery pack includes multiple battery cells, a box, and a handle. The box defines a first accommodation cavity and a second accommodation cavity, the second accommodation cavity is defined at a side of the first accommodation cavity, the multiple battery cells are accommodated in the first accommodation cavity, at least one reinforcing portion is disposed in the second accommodation cavity, and the at least one reinforcing portion protrudes from a top of the second accommodation cavity towards a bottom of the second accommodation cavity. The handle includes a handle body and a connecting portion, the connecting portion is connected with the handle body, the connecting portion defines at least one top-open groove at a top of the connecting portion, and the connecting portion is disposed in the second accommodation cavity and is movable between the top of the second accommodation cavity and the bottom of the second accommodation cavity. When the connecting portion moves to the top of the second accommodation cavity, the at least one reinforcing portion is at least partially accommodated in the at least one groove respectively.

According to implementations of a second aspect of the present disclosure, an electrical consumer includes a battery pack. The battery pack includes multiple battery cells, a box, and a handle. The box defines a first accommodation cavity and a second accommodation cavity, the second accommodation cavity is defined at a side of the first accommodation cavity, the multiple battery cells are accommodated in the first accommodation cavity, at least one reinforcing portion is disposed in the second accommodation cavity, and the at least one reinforcing portion protrudes from a top of the second accommodation cavity towards a bottom of the second accommodation cavity. The handle includes a handle body and a connecting portion, the connecting portion is connected with the handle body, the connecting portion defines at least one top-open groove at a top of the connecting portion, and the connecting portion is disposed in the second accommodation cavity and is movable between the top of the second accommodation cavity and the bottom of the second accommodation cavity. When the connecting portion moves to the top of the second accommodation cavity, the at least one reinforcing portion is at least partially accommodated in the at least one groove respectively.

BRIEF DESCRIPTION OF THE DRAWINGS

The above and/or additional aspects and advantages of the present disclosure will become apparent and easy to be understood from descriptions of the implementations with reference to accompanying drawings.

Figure 1:
FIG. 1 is an exploded structural diagram of a battery pack according to implementations of the present disclosure.

REFERENCE SIGNS battery pack 100; battery cell 10; box 20; first accommodation cavity 21; second accommodation cavity 22; top 1a of second accommodation cavity 22; bottom 1b of second accommodation cavity 22; reinforcing portion 23; first transition arc 24; second transition arc 25; first housing 26; second housing 27; housing body 28; protrusion 29; top 2a of protrusion 29; first plate portion 30; second plate portion 31; third plate portion 32; handle 40; handle body 41; connecting portion 42; top 3a of connecting portion 42; groove 43; stiffener 44; weight reducing groove 45; internal surface 46; external surface 47.

DETAILED DESCRIPTION

A battery pack 100 is described below with reference to FIG. 1 to FIG. 5 according to implementations of the present disclosure, and an electrical consumer with the above battery pack 100 is further proposed in the present disclosure.

Figure 2:
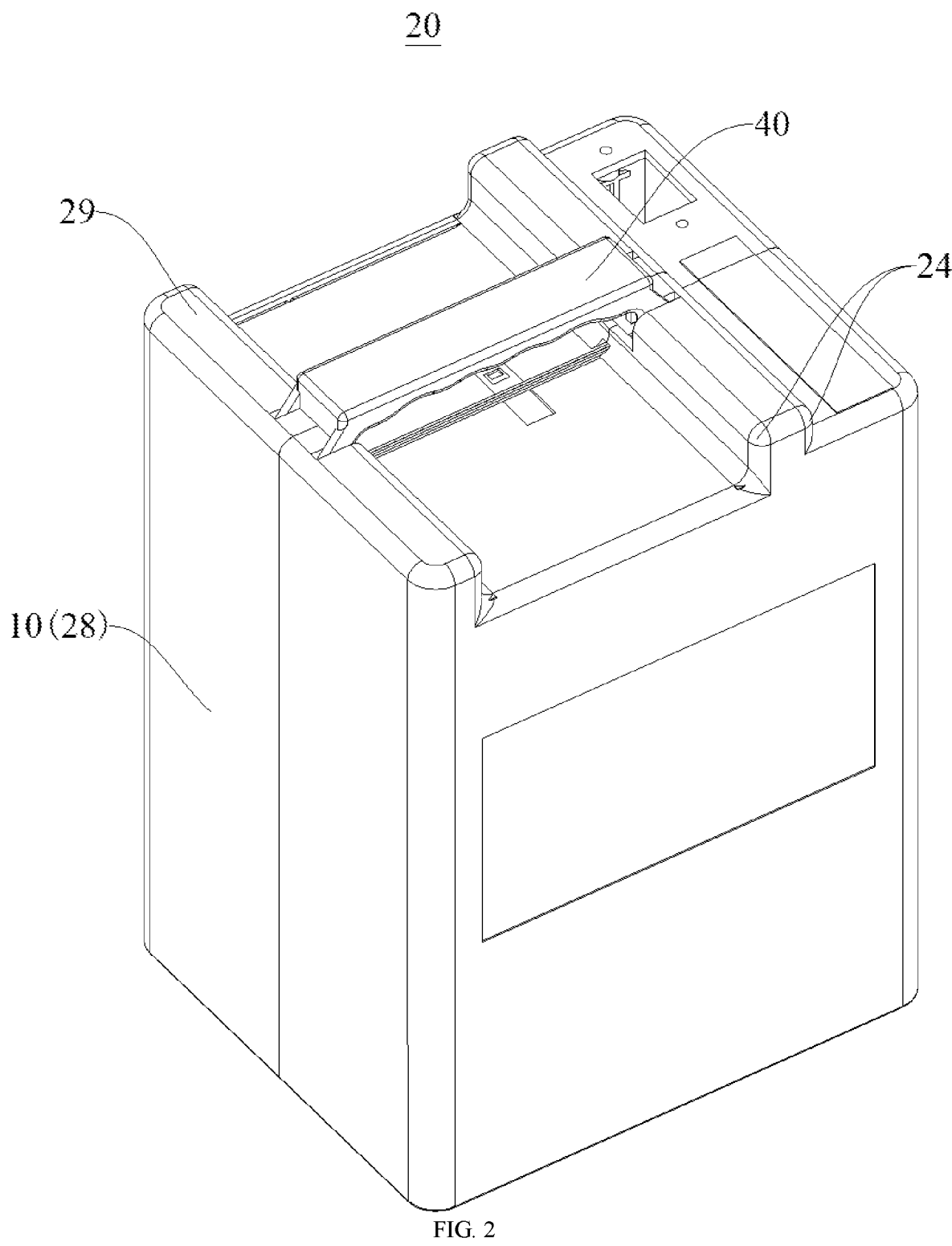
FIG. 2 is a schematic structural diagram of a battery pack according to implementations of the present disclosure.

Reference can be made to FIG. 1 and FIG. 2. According to implementations of a first aspect of the present disclosure, a battery pack 100 is applicable to an electrical consumer. The battery pack 100 includes multiple battery cells 10, a box 20, and a handle 40.

Figure 3:
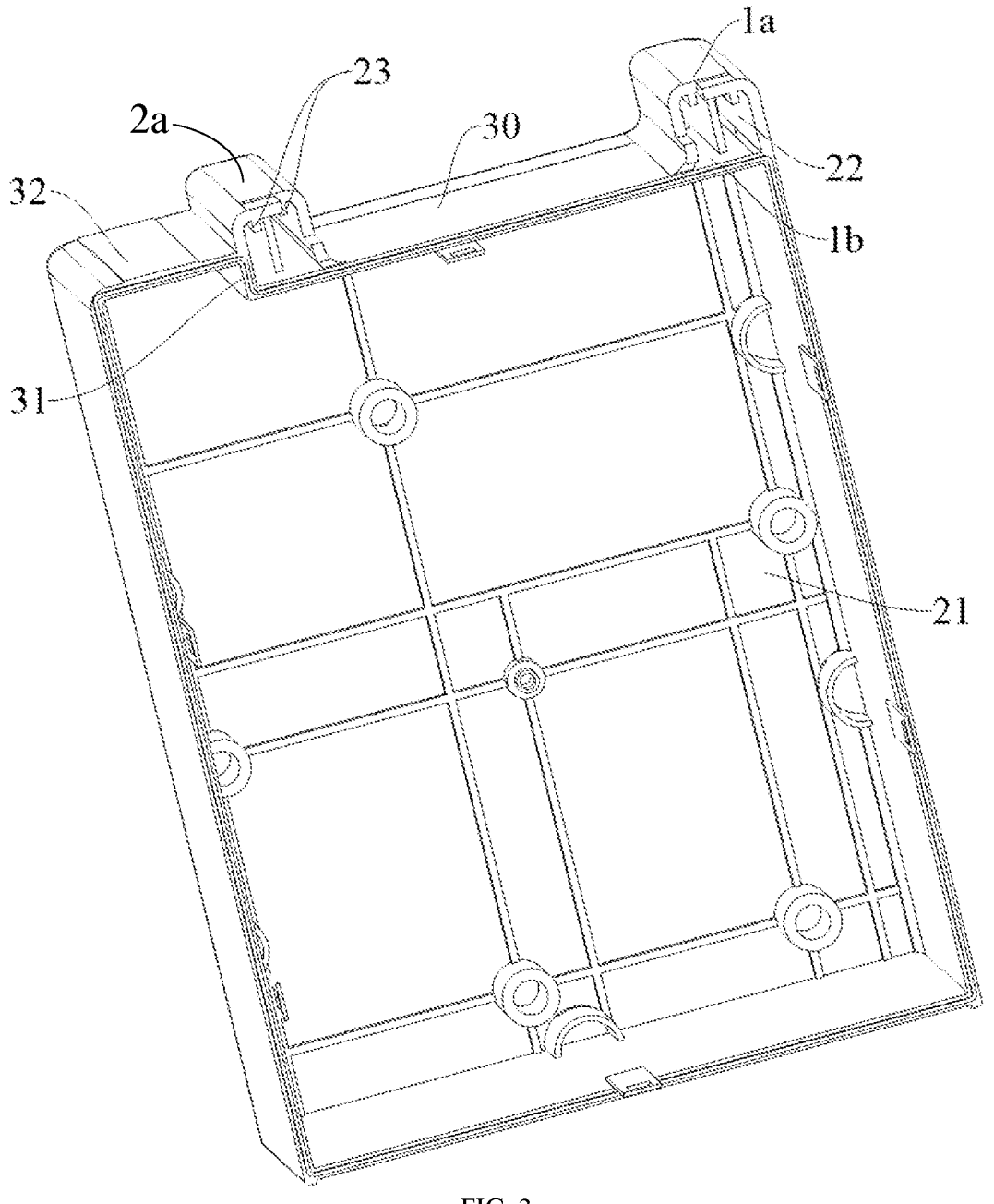
FIG. 3 is a schematic structural diagram of a housing of a box according to implementations of the present disclosure.

Reference can be made to FIG. 1 and FIG. 3. The box 20 defines a first accommodation cavity 21 and a second accommodation cavity 22, the second accommodation cavity 22 is defined at a side of the first accommodation cavity 21, the multiple battery cells 10 are accommodated in the first accommodation cavity 21, at least one reinforcing portion 23 is disposed in the second accommodation cavity 22, and the at least one reinforcing portion 23 protrudes from a top 1a of the second accommodation cavity 22 towards a bottom 1b of the second accommodation cavity 22. In other words, the box 20 includes two parts, which are the first accommodation cavity 21 and the second accommodation cavity 22, and the first accommodation cavity 21 can accommodate the multiple battery cells 10. With this disposing, the multiple battery cells 10 can be well wrapped to prevent battery cells 10 from contacting dust or water mist, and reduce an impact of collision on the battery cells 10.

In addition, the second accommodation cavity 22 is located at the side of the first accommodation cavity 21, the at least one reinforcing portion 23 is disposed at the top 1a of the second accommodation cavity 22, and the at least one reinforcing portion 23 is vertically oriented towards the bottom 1b of the second accommodation cavity 22. With this disposing, on one hand, a structural strength of the second accommodation cavity 22 can be improved, on the other hand, a wall thickness of the second accommodation cavity 22 can be reduced and sufficient space utilization of the second accommodation cavity 22 can be provided.

Figure 4:
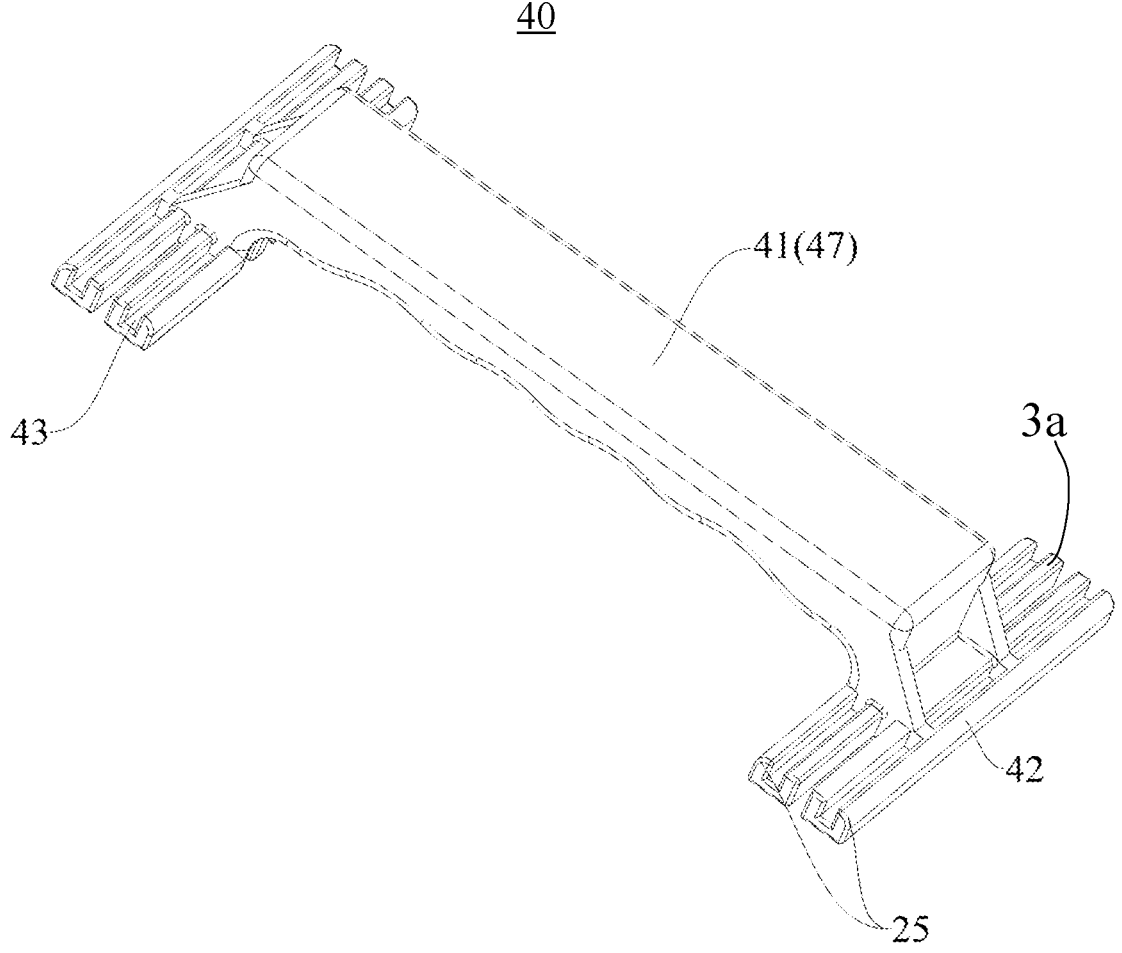
FIG. 4 is a schematic structural diagram of a handle from one angle according to implementations of the present disclosure.

Reference can be made to FIG. 1, FIG. 2, and FIG. 4. The handle 40 includes a handle body 41 and a connecting portion 42 connected with the handle body 41, the connecting portion 42 is disposed in the second accommodation cavity 22, and the connecting portion 42 is movable between the top 1a of the second accommodation cavity 22 and the bottom 1b of the second accommodation cavity 22. With this disposing, the handle 40 can move up and down in the second accommodation cavity 22, such that inconvenience of lifting and carrying the battery pack 100 due to integration of the box 20 and the handle 40 is avoided. In other implementations, the handle 40 may also include at least two connecting portions 42.

In addition, the connecting portion 42 defines at least one top-open groove 43 at a top 3a of the connecting portion 42, and when the connecting portion 42 moves to the top 1a of the second accommodation cavity 22, the at least one reinforcing portion 23 is at least partially accommodated in the at least one groove 43 respectively. In other words, at least a part of each of the at least one reinforcing portion 23 can be embedded in each of the at least one groove 43, such that each of the at least one groove 43 is in fitment with each of the at least one reinforcing portion 23 to make the connecting portion 42 move up and down between the top 1a of the second accommodation cavity 22 and the bottom 1b of the second accommodation cavity 22. With this disposing, on one hand, the at least one reinforcing portion 23 plays a great role in guiding, which facilitates fitting between the connecting portion 42 and the second accommodation cavity 22; and on the other hand, fitting between each of the at least one groove 43 and each of the at least one reinforcing portion 23 can improve stability of mounting between the connecting portion 42 and the second accommodation cavity 22, that is, a user takes the battery pack 100 more stably.

Therefore, combined with FIG. 1 to FIG. 4, the at least one reinforcing portion 23 is disposed in the second accommodation cavity 22 of the box 20 and the at least one groove 43 is defined in the connecting portion 42 of the handle 40, such that not only can a structural strength of the second accommodation cavity 22 be strengthened to make the second accommodation cavity 22 difficult to be deformed, but also mutual fitting between each of the at least one reinforcing portion 23 and each of the at least one groove 43 can be improved to make the connecting portion 42 move up and down between the top 1a of the second accommodation cavity 22 and the bottom 1b of the second accommodation cavity 22, which can better realize stable connection between the handle 40 and the box 20, reduce a frequency of replacing the battery pack 100, and effectively save costs.

Reference can be made to FIG. 3, each of the at least one reinforcing portion 23 can be structured in a rib shape, and each of the at least one groove 43 can be correspondingly disposed in a strip shape. With this disposing, each of the at least one reinforcing portion 23 can be better in fitment with each of the at least one groove 43, the connecting portion 42 can slide up and down in the second accommodation cavity 22 more conveniently, and a stuck phenomenon is not easy to occur. In addition, the at least one reinforcing portion 23 and the at least one groove 43 are disposed in strip shapes, such that a structure is relatively simple, which facilitates workshop production and processing, reduces processes, and saves costs.

In addition, a depth of each of the at least one groove 43 is greater than or equal to a height of each of the at least one reinforcing portion 23. With this disposing, each of the at least one reinforcing portion 23 can be well embedded into each of the at least one groove 43, which greatly improves the fitting between each of the at least one reinforcing portion 23 and each of the at least one groove 43, and better improves the stability of mounting between the handle 40 and the second accommodation cavity 22. Moreover, the top 3a of the connecting portion 42 is in contact with the top 1a of the second accommodation cavity 22, such that the structural strength of the second accommodation cavity 22 can be strengthened, and the second accommodation cavity 22 is not easily deformed by external force factors. If the depth of each of the at least one groove 43 is less than the height of each of the at least one reinforcing portion 23, only a part of each of the at least one reinforcing portion 23 is in each of the at least one groove 43. When gravity of the battery cells 10 is transmitted to the at least one groove 43 of the connecting portion 42, the at least one reinforcing portion 23 is easy to be broken or deformed due to insufficient bearing force, thus affecting up-and-down movement and normal use of the handle 40.

In addition, the second accommodation cavity 22 has first transition arcs 24 at two sides of the top 1a of the second accommodation cavity 22, the connecting portion 42 has second transition arcs 25 at two sides of the top 3a of the connecting portion 42, and when the connecting portion 42 moves to the top 1a of the second accommodation cavity 22, the first transition arcs 24 are in fitment with the second transition arcs 25. With this disposing, arc transitions are made on the two sides of the top 1a of the second accommodation cavity 22 and the two sides of the top 3a of the connecting portion 42, such that no surface of weakness is generated at a corner, stress concentration can be reduced, and sand washing, shrinkage hole, and cracks can also be avoided. In addition, when the connecting portion 42 moves to the top 1a of the second accommodation cavity 22, fitting between the first transition arcs 24 and the second transition arcs 25 is well realized, thereby avoiding friction damage between the second accommodation cavity 22 and the connecting portion 42.

Reference can be made to FIG. 3, at least two reinforcing portions 23 may be disposed in the second accommodation cavity, and at the top 1*a* of the second accommodation cavity 22, the at least two reinforcing portions 23 extend in a length direction of the second accommodation cavity 22 and are spaced apart in a width direction of the second accommodation 22. In other words, each of the at least two reinforcing portion 23 can extend in the length direction of the second accommodation cavity 22, and the at least two reinforcing portions 23 can be disposed in the width direction of the second accommodation cavity 22. With this disposing, a structural strength of the top 1*a* of the second accommodation cavity 22 can be improved, and a wall thickness of the second accommodation cavity 22 can also be reduced, such that the box 20 has a certain portability. If only one reinforcing portion 23 is disposed at the top 1*a* of the second accommodation cavity 22, when the reinforcing portion 23 is in fitment with a groove 43 to move upwards, the second accommodation cavity 22 can be deformed and bulged at the top 1*a* of the second accommodation cavity 22 due to insufficient strength.

In addition, the connecting portion 42 may define at least two grooves 43, and at the top 3*a* of the connecting portion 42, the at least two grooves 43 extend in a length direction of the connecting portion 42 and are spaced apart in a width direction of the connecting portion 42, and the at least two reinforcing portions 23 are in one-to-one fitment with the at least two grooves 43. With this disposing, each of the at least two grooves 43 can have a length extending in the length direction of the connecting portion 42, and the at least two grooves 43 can be spaced apart in the width direction of the connecting portion 42, such that reinforcing portions 23 and grooves 43 of the same quantities can be in one-to-one fitment with each other, which effectively improves the stability of mounting between the connecting portion 42 and the second accommodation cavity 22 to make the handle 40 difficult to fall off the box 20.

Reference can be made to FIG. 1 and FIG. 2, and the box 20 includes a first housing 26 and a second housing 27, the first housing 26 and the second housing 27 are disposed opposite to each other, and the first housing 26 and the second housing 27 together define the first accommodation cavity 21 and the second accommodation cavity 22. In other words, the box 20 has two parts, which are the first housing 26 and the second housing 27. The two parts are disposed opposite to each other to mount, and the first housing 26 and the second housing 27 together define the first accommodation cavity 21. With this disposing, the multiple battery cells 10 can be well wrapped to prevent the battery cells 10 from contacting dust or water mist. In addition, if the first housing 26 and the second housing 27 are disposed up and down, gravity of all battery cells is only distributed on a bottom of the first housing 26 or a bottom of the second housing 27, such that the first housing 26 and the second housing 27 are easier to be disconnected, which leads to falling off of the battery cells 10. Therefore, the first housing 26 and the second housing 27 which are disposed on the left and the right can also make gravity of the multiple battery cells 10 uniformly distributed on the first housing 26 and the second housing 27, such that a problem that the battery cells 10 fall off since the bottom of the box 20 bears gravity alone is well solved, which greatly improves service life of the battery pack 100.

In addition, each of the first housing 26 and the second housing 27 includes a housing body 28 and a protrusion 29, the protrusion 29 is disposed on a side of the housing body 28, the housing body 28 of the first housing 26 and the housing body 28 of the second housing 27 are disposed opposite to each other and together define the first accommodation cavity 21, and the protrusion 29 of the first housing 26 and the protrusion 29 of the second housing 27 are disposed opposite to each other and together define the second accommodation cavity 22. In other words, the first housing 26 has the housing body 28 and the protrusion 29, and the protrusion 29 is disposed on the side of the housing body 28. Similarly, the second housing 27 has the housing body 28 and the protrusion 29.

In addition, the housing body 28 of the first housing 26 and the housing body 28 of the second housing 27 are disposed opposite to each other and together define the first accommodation cavity 21. In other words, in this way, the housing body 28 of the first housing 26 can be well snapped into the housing body 28 of the second housing 27 correspondingly, such that the multiple battery cells 10 can be well accommodated in the first accommodation cavity 21. Moreover, the first housing 26 and the second housing 27 are disposed opposite to each other and together define the second accommodation cavity 22. Thus, when the handle 40 is connected with the first housing 26 and the second housing 27, the handle 40 can be correspondingly mounted at the protrusion 29 of the first housing 26 and the protrusion 29 of the second housing 27, such that connections of the handle 40 with the first housing 26 and the second housing 27 can be realized, and up-and-down movement of the handle 40 relative to the first housing 26 and the second housing 27 can be realized.

Reference can be made to FIG. 3, and the housing body 28 has a side wall including a first plate portion 30, a second plate portion 31, and a third plate portion 32. The second plate portion 31 is connected between the first plate portion 30 and the third plate portion 32, the second plate portion 31 is connected with the first plate portion 30 and the third plate portion 32 in a bent manner, the third plate portion 32 is higher than the first plate portion 30, and the protrusion 29 is disposed at the first plate portion 30. In other words, the third plate portion 32 is closer to a plane where the top 1*a* of the second accommodation cavity 22 is located than the first plate portion 30. The side wall of the housing body 28 has a multi-flat-surface structure, and the second plate portion 31 is connected between the first plate portion 30 and the third plate portion 32. The first plate portion 30 and the third plate portion 32 are horizontal, and the second plate portion 31 is vertically connected with the first plate portion 30 and the third plate portion 32 in a bent manner. With this disposing, the side wall of the housing body 28 is in a step shape. On one hand, a bearing strength of the side wall of the housing body 28 can be increased. If the side wall of the housing body 28 is disposed as a single flat surface, the side wall of the housing body 28 is easy to be deformed when subjected to an external force. Therefore, the side wall of the housing body 28 is disposed as the step shape, such that the side wall of the housing body 28 is not easy to be deformed, durability of the housing body 28 is improved. On the other hand, the housing body 28 can also have a better utilization rate in an upper space of the housing body 28. When the handle 40 is movably connected with the first housing 26 and the second housing 27, the handle 40 corresponds to first plate portions 30, that is, the handle 40 is close to or away from the first plate portions 30.

In addition, the protrusion 29 is disposed at the first plate portion 30. In other words, compared with the second plate portion 31 and the third plate portion 32, the first plate portion 30 has an external surface with a relatively large area, so the protrusion 29 is reasonably disposed at the first plate portion 30 to greatly improve strength and stiffness of the protrusion 29. If the protrusion 29 is disposed at the second plate portion 31 or the third plate portion 32, a problem of a poor structural strength of the protrusion 29 is easy to occur, such that when the battery pack 100 is lifted with the handle 40, the protrusion 29 may appear cracks. After long-term use, the handle 40 is likely to fall off the box 20, which leads to local damage to the box 20, and then leads to a problem of replacing the whole box 20. Therefore, the protrusion 29 is disposed at the first plate portion 30, which can greatly prolong service life of the box 20.

Moreover, a top 2a of the protrusion 29 is higher than the third plate portion 32. In other words, the top 2a of the protrusion 29 is farther from a plane where the bottom 1b of the accommodation cavity is located than the third plate portion 32. In this way, especially for the third plate portion 32, a side wall of the box 20 is better protected from being damaged by an external force. When the top 2a of the protrusion 29 is lower than the third plate portion 32, no enough space can be provided for the handle 40 to be placed, to make it inconvenient for a person to lift the handle 40.

Furthermore, when the handle 40 is accommodated, a top surface (i.e., an external surface 47) of the handle 40 can correspond to a top surface of the protrusion 29, such that an integrity of the battery pack 100 can be improved.

Figure 5:
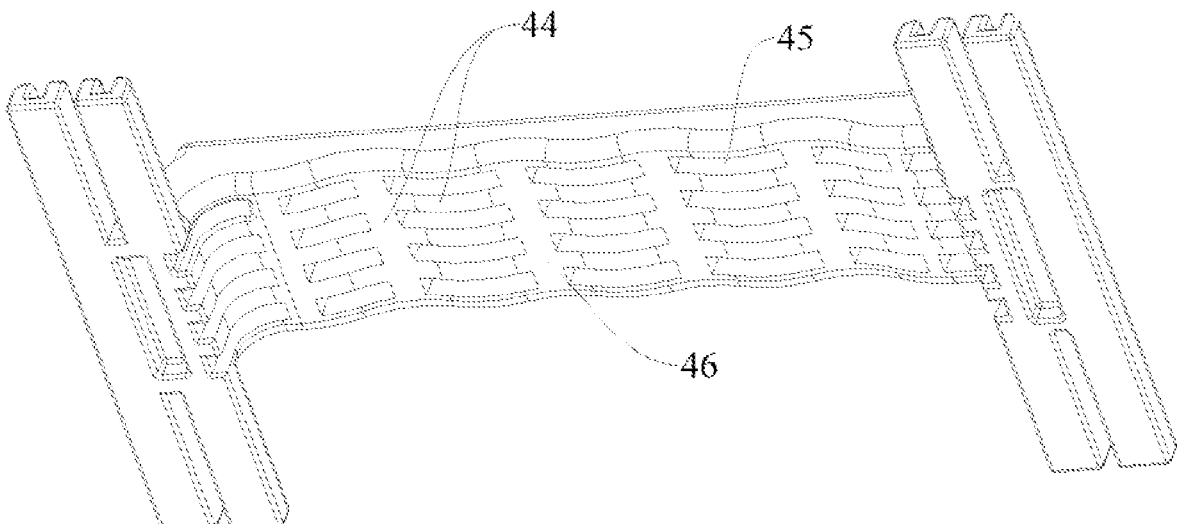
FIG. 5 is a schematic structural diagram of a handle from another angle according to implementations of the present disclosure.

Reference can be made to FIG. 5, and the handle body 41 is provided with multiple stiffeners 44 on a surface thereof facing the box 20. With this disposing, on one hand, the structural strength of the handle 40 can be improved by stiffeners 44, such that the handle body 41 is not easy to be broken, so as to avoid affecting normal use of the handle 40. On the other hand, the stiffeners 44 are disposed on an internal surface 46 of the handle 40, such that dust is difficult to fall on the internal surface 46 and the internal surface 46 is easy to be cleaned, and an integrity of the external surface 47 of the handle 40 can be improved. In other words, the surface of the handle body 41 facing the box 20 is the internal surface 46. Each stiffener 44 may extend in a length direction of the handle 40 or extend in a width direction of the handle 40. With this disposing, the structural strength of the handle 40 can be improved. Furthermore, the multiple stiffeners 44 are not only disposed in the length direction of the handle 40, but also disposed in the width direction of the handle 40, such that the structural strength of the handle 40 can be further improved.

In addition, weight reducing grooves 45 are defined among the multiple stiffeners 44. In this way, the weigh reducing grooves 45 can reduce a weight of the handle 40, such that the battery pack 100 has a relatively light overall weight and is portable, which is conducive to having a competitive advantage in the same type of products in the market.

According to implementations of a second aspect of the present disclosure, an electrical consumer includes the battery pack 100 in the above implementations. The at least one reinforcing portion 23 is disposed in the second accommodation cavity 22 of the box 20 and the at least one groove 43 is defined in the connecting portion 42 of the handle 40, such that not only can the structural strength of the second accommodation cavity 22 be strengthened to make the second accommodation cavity 22 difficult to be deformed, but also the mutual fitting between each of the at least one reinforcing portion 23 and each of the at least one groove 43 can be improved to make the connecting portion 42 move up and down between the top 1a of the second accommodation cavity 22 and the bottom 1b of the second accommodation cavity 22, which can better realize stable connection between the handle 40 and the box 20, facilitate a person to lift and carry the battery pack 100, reduce a frequency of replacing the battery pack 100, and effectively save costs.

In addition, a box-housing structure of the box 20 of the battery pack 100 is changed, such that gravity of the battery cells 10 is uniformly distributed on the box 20, and a problem that the multiple battery cells 10 fall off a bottom of the box due to insufficient bearing force at the bottom of the box 20 is avoided.

In the description of the present disclosure, it should be understood that terms such as "center", "length", "width", "thickness", "upper", "lower", "vertical", "horizontal", "top", "bottom", "inner", "outer", indicate orientation or positional relationships based on orientation or positional relationships illustrated in the accompanying drawings. These terms are only for convenience of describing the present disclosure and simplifying description, and do not indicate or imply that a device or an element referred to must have a particular orientation, or constructed or operated in a particular orientation. Thus, these terms cannot be understood as a limitation to the present disclosure.

In the description of the present specification, the description with reference to the terms "one implementation", "some implementations", "exemplary implementations", "examples", "specific examples", "some examples", etc., means that the specific feature, structure, material, or feature described in combination with the implementation or example is included in at least one implementation or example of the present disclosure. In this specification, the schematic representations of the above terms do not necessarily refer to the same implementation or example.

Although the implementations of the present disclosure have been shown and described, those of ordinary skill in the art may understand that various changes, modifications, substitutions, and variants may be made to these implementations without departing from the principle and purpose of the present disclosure. The scope of the present disclosure is defined by the claims and their equivalents.

What is claimed is:

1. A battery pack, comprising:

a plurality of battery cells;

a box defining a first accommodation cavity and a second accommodation cavity, wherein the second accommodation cavity is defined at a side of the first accommodation cavity, the plurality of battery cells are accommodated in the first accommodation cavity, at least one reinforcing portion is accommodated in the second accommodation cavity, and the at least one reinforcing portion protrudes from a top of the second accommodation cavity towards a bottom of the second accommodation cavity; and a handle comprising a handle body and a connecting portion, wherein the connecting portion is connected with the handle body, the connecting portion defines at least one top-open groove at a top of the connecting portion away from the plurality of battery cells, each of the at least one groove has an opening oriented in a direction facing away from the plurality of battery cells, the connecting portion is accommodated in the second accommodation cavity and is movable between the top of the second accommodation cavity and the bottom of the second accommodation cavity, and when the connecting portion moves to the top of the second accommodation cavity, the at least one reinforcing portion is at least partially accommodated in the at least one groove respectively.

2. The battery pack of claim 1, wherein each of the at least one reinforcing portion is structured in a rib shape, and each of the at least one groove is disposed in a strip shape.

3. The battery pack of claim 1, wherein a depth of each of the at least one groove is greater than or equal to a height of each of the at least one reinforcing portion.

4. The battery pack of claim 1, wherein the second accommodation cavity has first transition arcs at two sides of the top of the second accommodation cavity, the connecting portion has second transition arcs at two sides of the top of the connecting portion, and when the connecting portion moves to the top of the second accommodation cavity, the first transition arcs are in fitment with the second transition arcs.

5. The battery pack of claim 1, wherein at least two reinforcing portions are disposed in the second accommodation cavity, and at the top of the second accommodation cavity, the at least two reinforcing portions extend in a length direction of the second accommodation cavity and are spaced apart in a width direction of the second accommodation; and the connecting portion defines at least two grooves, the at least two grooves extend in a length direction of the connecting portion and are spaced apart in a width direction of the connecting portion, and the at least two reinforcing portions are in one-to-one fitment with the at least two grooves.

6. The battery pack of claim 1, wherein the box comprises a first housing and a second housing, the first housing and the second housing are disposed opposite to each other, and the first housing and the second housing together define the first accommodation cavity and the second accommodation cavity.

7. The battery pack of claim 6, wherein each of the first housing and the second housing comprises a housing body and a protrusion, the protrusion is disposed at a side of the housing body, the housing body of the first housing and the housing body of the second housing are disposed opposite to each other and together define the first accommodation cavity, and the protrusion of the first housing and the protrusion of the second housing are disposed opposite to each other and together define the second accommodation cavity.

8. The battery pack of claim 7, wherein the housing body has a side wall comprising a first plate portion, a second plate portion, and a third plate portion, the second plate portion is connected between the first plate portion and the third plate portion, the second plate portion is connected with the first plate portion and the third plate portion in a bent manner, the third plate portion is higher than the first plate portion, and the protrusion is disposed at the first plate portion.

9. The battery pack of claim 8, wherein the protrusion has a top higher than the third plate portion.

10. The battery pack of claim 1, wherein the handle body is provided with a plurality of stiffeners on a surface thereof facing the box, and weight reducing grooves are defined among the plurality of stiffeners.

11. An electrical consumer, comprising:
a battery pack comprising:
a plurality of battery cells;
a box defining a first accommodation cavity and a second accommodation cavity, wherein the second accommodation cavity is defined at a side of the first accommodation cavity, the plurality of battery cells are accommodated in the first accommodation cavity, at least one reinforcing portion is accommodated in the second accommodation cavity, and the at least one reinforcing portion protrudes from a top of the second accommodation cavity towards a bottom of the second accommodation cavity; and
a handle comprising a handle body and a connecting portion, wherein the connecting portion is connected with the handle body, the connecting portion defines at least one top-open groove at a top of the connecting portion away from the plurality of battery cells, each of the at least one groove has an opening oriented in a direction facing away from the plurality of battery cells, the connecting portion is accommodated in the second accommodation cavity and is movable between the top of the second accommodation cavity and the bottom of the second accommodation cavity, and when the connecting portion moves to the top of the second accommodation cavity, the at least one reinforcing portion is at least partially accommodated in the at least one groove respectively.

12. The electrical consumer of claim 11, wherein each of the at least one reinforcing portion is structured in a rib shape, and each of the at least one groove is disposed in a strip shape.

13. The electrical consumer of claim 11, wherein a depth of each of the at least one groove is greater than or equal to a height of each of the at least one reinforcing portion.

14. The electrical consumer of claim 11, wherein the second accommodation cavity has first transition arcs at two sides of the top of the second accommodation cavity, the connecting portion has second transition arcs at two sides of the top of the connecting portion, and when the connecting portion moves to the top of the second accommodation cavity, the first transition arcs are in fitment with the second transition arcs.

15. The electrical consumer of claim 11, wherein at least two reinforcing portions are disposed in the second accommodation cavity, and at the top of the second accommodation cavity, the at least two reinforcing portions extend in a length direction of the second accommodation cavity and are spaced apart in a width direction of the second accommodation; and the connecting portion defines at least two grooves, the at least two grooves extend in a length direction of the connecting portion and are spaced apart in a width direction of the connecting portion, and the at least two reinforcing portions are in one-to-one fitment with the at least two grooves.

16. The electrical consumer of claim 11, wherein the box comprises a first housing and a second housing, the first housing and the second housing are disposed opposite to each other, and the first housing and the second housing together define the first accommodation cavity and the second accommodation cavity.

17. The electrical consumer of claim 16, wherein each of the first housing and the second housing comprises a housing body and a protrusion, the protrusion is disposed at a side of the housing body, the housing body of the first housing and the housing body of the second housing are disposed opposite to each other and together define the first accommodation cavity, and the protrusion of the first housing and the protrusion of the second housing are disposed opposite to each other and together define the second accommodation cavity.

18. The electrical consumer of claim 17, wherein the housing body has a side wall comprising a first plate portion, a second plate portion, and a third plate portion, the second plate portion is connected between the first plate portion and the third plate portion, the second plate portion is connected with the first plate portion and the third plate portion in a bent manner, the third plate portion is higher than the first plate portion, and the protrusion is disposed at the first plate portion.

19. The electrical consumer of claim 18, wherein the protrusion has a top higher than the third plate portion.

20. The electrical consumer of claim 11, wherein the handle body is provided with a plurality of stiffeners on a surface thereof facing the box, and weight reducing grooves are defined among the plurality of stiffeners.

\*  \*  \*  \*  \*